Dec. 28, 1926.
V. LAMBERT
1,612,029
COFFEE URN
Filed Jan. 8, 1924
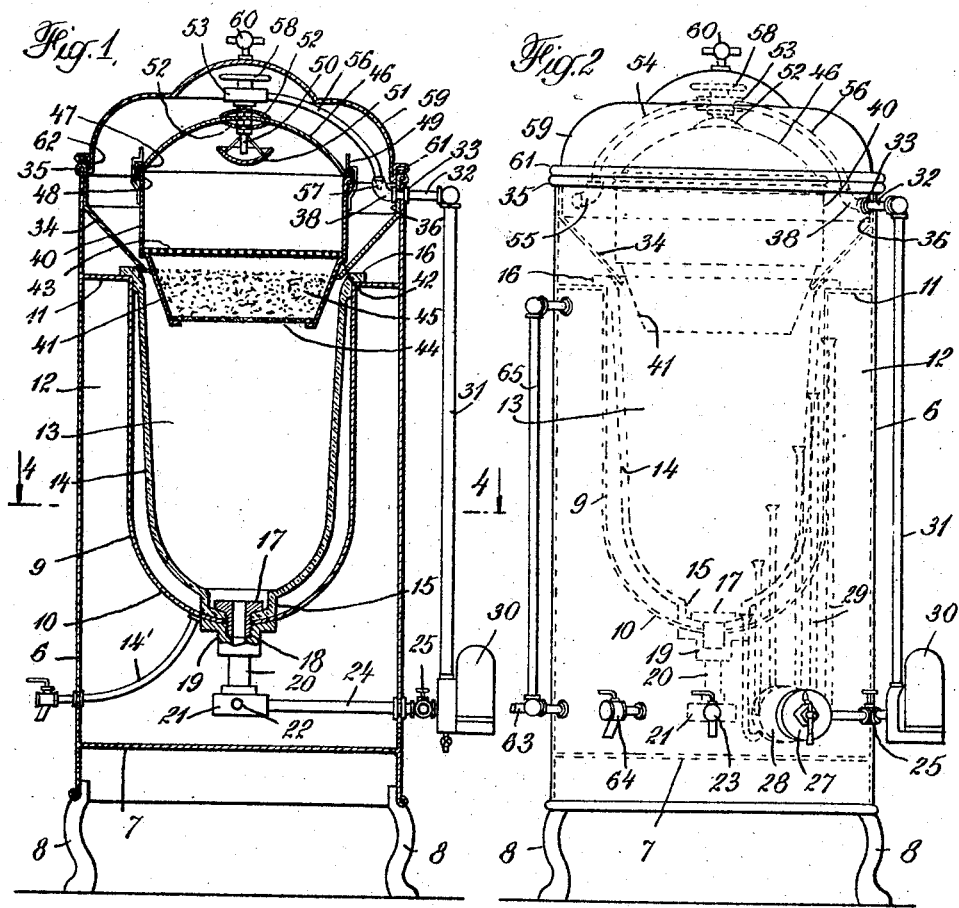
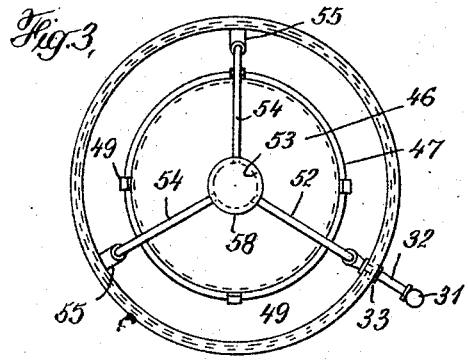
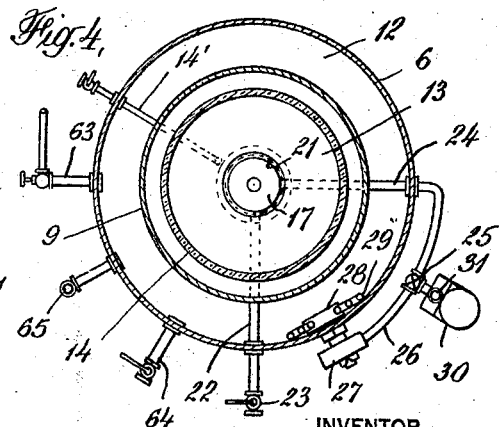
INVENTOR
Victor Lambert
BY
Pennie, Davis, Marvin & Edmonds
his ATTORNEYS Patented Dec. 28, 1926.

1,612,029

UNITED STATES PATENT OFFICE.

VICTOR LAMBERT, OF BROOKLYN, NEW YORK, ASSIGNOR TO AARON M. SLOSS, OF NEW YORK, N. Y.

COFFEE URN.

Application filed January 3, 1924. Serial No. 684,933.

This invention relates to coffee urns such as are commonly used in hotels and restaurants, and involves the provision of a new and improved type of urn which has various novel features of construction presently to be set forth.

Coffee urns ordinarily consist of a cylindrical casing made of a non-corrodible metal supported on suitable legs. The lower end of the casing is closed by a head which lies a short distance within the casing and the flame of the burner impinges against this head, while the extending end of the casing forms a curtain to protect the flame. The casing is divided into two compartments by means of a partition which is also cylindrical in form and has a rounded, closed end. The open end of the partition is secured to the casing by a flange and the outer compartment so formed is for hot water while the inner compartment contains the coffee liquid. It is usual to provide a coffee compartment with a liner made of porcelain or other vitreous material, and an outlet is provided so that the coffee liquid may be withdrawn from the compartment and dispensed as required.

In this type of urn the coffee is supported in a bag of fabric secured to a ring which is of slightly greater diameter than the coffee compartment and is placed on the lateral flange with the bag hanging down in the coffee compartment. The liner requires removal occasionally for cleaning purposes and sometimes becomes broken or injured in use so that it is desirable that the urn be arranged for easy removal of the liner. Also the use of a fabric bag for supporting the ground coffee is not altogether sanitary and the fabric rots in use and must be frequently replaced.

The present urn is intended to overcome the several objectionable features of urns as constructed at present and above briefly described, and in this urn there is used a liner which extends into the partition and is secured to the latter only at one point adjacent the outlet from the compartment. The lateral walls of the liner are spaced from the partition and the liner has a flange overlying the flange at the end of the partition but not secured thereto, so that the difference in the rate of expansion of the partition and liner will put no strain on the latter. The urn contains a metal vessel for the ground coffee. This vessel is preferably of cylindrical form having its lower end tapering and adapted to enter the open end of the coffee compartment. The vessel has a porous end wall which lies at its lower end and also contains a perforated partition which forms with the end wall a chamber for the coffee grounds. The upper end of the vessel is closed by a removable cover and attached to this cover is a spider, the legs of which are adapted to engage lugs located on the inner wall of the urn so as to provide a support for the cover and the vessel which is secured thereto. Also mounted within the cover is a nozzle and one of the legs of the spider is hollow and connected to this nozzle. The end of this hollow leg enters a lug which is also hollow and connected at its outer end to a pipe which is in turn connected to the outlet from the coffee compartment through a pump and a three-way valve. The third opening of the valve is connected to a measuring device extending into the water compartment of the urn and with this arrangement it is possible to open the measuring device and by the operation of the pump to transfer a measured quantity of water from the compartment through the pipe, the lug, the hollow leg of the spider, to the nozzle, whence the water is discharged and passes downwardly through the perforated partition, the mass of ground coffee and the porous wall of the coffee compartment. Since a single passage of water through the ground coffee is not sufficient to make liquid of the desired strength when water to the desired amount has been introduced through the coffee into the coffee compartment, the three-way valve is actuated so as to cut off the measuring device and connect the coffee compartment outlet with the pump, whereupon the latter is brought into action to withdraw the liquid from the bottom of the coffee compartment and introduce it therein through the ground coffee through the connections previously described.

The coffee vessel is removable as a unit without the necessity of employing wrenches or other tools, and when the vessel has been taken out of the urn the connections at the bottom of the coffee compartment may be unscrewed and the liner quickly withdrawn.

In the accompanying drawings there is illustrated that form of the invention which is now preferred, and in these drawings, Fig. 1 is a vertical section of the new coffee urn, Fig. 2 is a side elevation, Fig. 3 is a plan view with the cover removed, Fig. 4 is a sectional view on the line 4—4 of Fig. 1, and Fig. 5 is a sectional view of a detail of one of the connections of the spider.

Referring to these drawings, the urn is seen to consist of a casing 6, made of a non-corrodible metal such as copper ordinarily nickel plated. This casing is cylindrical and closed at its lower end by a head 7 which is spaced inwardly from the lower end of the casing a slight distance. The casing rests on legs 8, 8 which support it a sufficient distance above the counter or table so that a burner may be placed under the lower end with its flame impinging on the head 7. Within the casing is a partition 9, cylindrical in cross section and having a domed closed end 10. At its upper end the partition has a lateral flange 11 annular in form and welded or otherwise secured to the inner wall of the casing 6. This partition 9 divides the urn into two compartments, the outer one 12 being for water, while the inner one 13 is for coffee.

Mounted within the coffee compartment is a liner 14 which has a shape corresponding in general to the shape of the partition, with an extension 15 on its lower end which rests against the inner wall of the partition. The side walls of the liner, however, are spaced from the partition, as is shown and this space is provided with a clean-out pipe 14' having a pet cock beyond the wall of the casing so that the chamber within the partition may be flushed out. At its upper end the liner terminates in a lateral flange 16 which overlies the flange 11. At the lower end the liner has an extension 15 which has a lateral aperture in which is placed a bushing 17 and this bushing passes through the orifice in the extension and through a similar orifice in the end of the partition. At its lower end the bushing 17 is threaded as at 18 and enters a threaded passage in a similar bushing 19 which lies outside the partition in the water compartment. This bushing 19 has threaded into its lower end a pipe 20 on the end of which is mounted a two-way fitting 21, one outlet from which is connected with a pipe 22 which extends through the wall of the casing of the urn and carries a draw-off valve 23 at its outer end. The other outlet from the fitting is connected with a pipe 24 which extends beyond the wall of the casing and is connected to one opening of a three-way valve 25. Another opening from this valve is connected to a pipe 26 which is connected to a measuring device 27 located on the outside of the casing and connected to a block 28 inside the water compartment of the casing. This block 28 carries a plurality of inlet pipes 29 which extend vertically in the casing to different heights. The measuring device forms the subject of my copending application, Ser. No. 681,923, filed December 21, 1923, and need not be described in detail. However, the construction of the device is such that any selected inlet pipe may be connected to the pipe 26 so that the quantity of water which lies between the end of that inlet pipe and the water level in the water compartment may be withdrawn through the device.

The third opening from the valve 25 is connected to a pump 30 which may be either manually or electrically operated. This pump has an outlet connected to a pipe 31 extending vertically and this pipe may be made of glass so as to be used for gauge purposes. At its upper end the pipe 31 is connected to another pipe 32 which threads into a bushing 33 extending through the wall of the casing. In the upper end of the casing there is provided a shield 34 the upper end of which terminates in a bead 35 which is adapted to overlie the rim of the casing. At its lower end the shield tapers inwardly and extends a slight distance within the flange 16 of the liner. The flat portion 36 of the shield which lies close to the inner wall of the casing has an aperture through which the bushing 33 extends, this bushing being held in place by a nut 37 on the outside of the casing. Threaded into the inner end of the bushing is an elbow 38, the other end of which has a conical seat 39.

The vessel for the coffee is shown more clearly in Fig. 1, and has a cylindrical body 40 terminating in a tapered end 41. The tapered end portion is connected to the main body of the vessel so as to provide a shoulder 42 upon which rests a perforated metal plate 43. The tapered end of the vessel is closed by a porous wall 44 which may be in the form of a metal screen of sufficiently fine mesh so as to prevent the passage therethrough of finely pulverized coffee. The tapered portion of the vessel which is defined by the perforated plate 43 in the porous wall 44 contains the ground coffee shown at 45.

The vessel is provided with a domed cover 46 the edge of which carries a bead 47 which is to rest on a similar bear 48 on the rim of the body of the vessel. The vessel carries a plurality of snap hooks 49 which may be slipped into place as shown in Fig. 1 to secure the body of the vessel to the cover. Extending through the top of the cover is a pipe 50, held in place by suitable lock nuts. The case at its lower end has a cup-shaped shield 51, spaced from the end of the pipe so as to provide a splash nozzle. Mounted on the pipe 50 on either side of the cover are spring plates 52, 52, which are held in place on the pipe by lock nuts. These plates serve to give the cover a resilient mounting with reference to the pipe. The pipe 50 is threaded at its outer end into a hub 53 from which extend radially and downwardly a plurality of legs 54 forming a spider. These legs have portions which enter slots formed in the lugs 55 mounted on the inner wall of the casing and the hub with its lugs provides a spider which serves as a support for the cover and the vessel which is secured thereto. One of the legs 56 of the spider is hollow and is provided with a conical end 57 which is mounted to rest upon the conical seat 39 of the elbow 38, thus establishing a connection between the nozzle 51 and the pump 30. The hub is also provided with a handle 58 by which the vessel with its supporting spider may be quickly removed from place within the casing. It will be understood that the slots in the lugs 55 are suitably formed so that the ends of the legs of the spider may be readily inserted therein and when the vessel is mounted in place its weight will hold the legs seated in the lugs and also cause the conical tip 57 to be seated against the seat in the elbow 38 so as to provide a substantially water-tight connection.

The urn casing is closed by a domed cover 59 provided with a handle 60. The rim of this cover has a bead 61 which is intended to rest on the bead 35 and the cover has a flange 62 which extends downwardly within the shield 34 so that the cover is held firmly in place.

The urn is provided with a water inlet 63 located near its lower end; also a draw-off connection 64. The water compartment is provided with the usual gauge glass 65 so that the height of the water in the water compartment may be readily ascertained.

In operation a quantity of water will be introduced into the water compartment to any desired level, and brought to boiling temperature. This water is then withdrawn through the measuring device in measured quantities and pumped through the pipes 31 and 32 and the hollow leg 56 to the nozzle on the end of the pipe 50, whence the water is discharged and passes down through the coffee in the coffee vessel and into the coffee compartment. The valve 25 may now be adjusted to cut off the measuring device and open the outlet from the coffee compartment to the pump whereupon the contents of the coffee compartment will again be conveyed to the nozzle and discharged into the coffee compartment through the ground coffee. Should it become necessary at any time to introduce fresh ground coffee into the vessel the cover of the urn will be removed and the vessel removed by means of the handle 58. Since the legs of the spider are held in place simply by gravity the vessel may be easily removed without the use of tools. After removal the spring hooks 49 are operated to permit the cover of the vessel to be taken off; then the partition 43 is removed and the exhausted grounds replaced with fresh coffee. It will be noted that the legs of the spider extend some distance beyond the edge of the cover so that when the cover is removed it will rest on the ends of the spider, thus avoiding the possibility of damage being done to the cover itself and also to the nozzle within it.

Should it become necessary at any time to remove the liner the coffee vessel is removed and the nuts 37 on the lugs which support the spider are removed so that the lugs may be withdrawn from the apertures through the shield 34 and the wall of the casing. The bushing 18 may then be unthreaded. For this purpose the bushing will have a slot formed across the upper face into which a flat tool may be inserted. With the bushing unthreaded from the outer bushing 19 the liner is readily removable and a new one may be quickly inserted in place. With this type of urn, however, the life of the liner is greatly increased because as the liner is supported and held against movement relative to the partition only at its closed end any difference in expansion and contraction between the material of the liner and the metal of the partition will not subject the liner to strain. The liner does not fit the wall of the partition tightly, as will be apparent from Fig. 1, and consequently there is no possibility of the partition exerting a collapsing strain which would cause the liner to crack.

By reason of the coffee being contained in a vessel which is made entirely of metal, no replacement of the parts is necesary as is ordinarily the case when a fabric bag is used. The coffee vessel also may be readily disassembled and all parts easily kept in a sanitary condition.

I claim:

1. A coffee urn comprising the combination of a casing, a partition in the casing dividing the latter into a water compartment and a coffee compartment, a vessel for ground coffee suspended in the casing above the coffee compartment and having no connection with the partition, a nozzle carried by the vessel, a connection from the outlet from the coffee compartment to the nozzle, and a pump in said connection.

2. A coffee urn comprising the combination of a casing, a partition in the casing dividing the later into a water compartment and a coffee compartment, a vessel for ground coffee, a spider secured to the vessel and adapted to engage portions of the casing for supporting the vessel therein, one of the legs of the spider being hollow, a nozzle within the vessel connected with the end of the hollow leg, a connection with an outlet from the coffee compartment and with the end of the hollow leg, and a pump in the connection.

3. A coffee urn comprising the combination of a casing, a partition within the casing dividing the latter into a water compartment and a coffee compartment, the latter having an outlet, a liner in the coffee compartment having an outlet connected to the first outlet, a vessel for ground coffee supported in the casing above the coffee compartment and having no connection with the partition, a nozzle carried by said vessel, a connection between the nozzle and the coffee compartment outlet, and a pump in said connection.

4. A coffee urn comprising the combination of a casing, a partition within the casing dividing the latter into a water compartment and a coffee compartment, the latter having an outlet, a liner in the coffee compartment having an outlet connected with the first outlet, a vessel for ground coffee supported in the casing above the coffee compartment and having no connection with the partition, said vessel having a portion extending into the coffee compartment below the end of the liner, a nozzle carried by the other end of the vessel, a pipe connection between the coffee compartment outlet and the nozzle, and a pump in said connection.

5. In a coffee urn comprising a casing divided into a water compartment and a coffee compartment, a closed vessel for ground coffee comprising a shell and a cover, a partition in the shell forming a coffee chamber, the shell having a porous wall forming one end of the chamber, means secured to the cover for mounting the vessel in the casing and a nozzle in the vessel adapted to be connected to the coffee compartment of the urn.

6. In a coffee urn comprising a casing divided by a partition into a coffee compartment and a water compartment, the combination of a vessel for ground coffee, means independent of the partition for supporting the vessel in the casing and a nozzle in the vessel adapted to be connected to the coffee compartment of the urn.

7. In a coffee urn comprising a casing divided into a coffee compartment and a water compartment, a vessel for ground coffee comprising a shell and a cover, a spider attached to the cover and serving to support the vessel in the casing, one of the legs of the spider being hollow, and a nozzle mounted in the cover and connected to the hollow leg.

8. In a coffee urn comprising a casing divided into a coffee compartment and a water compartment, a vessel for ground coffee comprising a shell having a porous wall, a cover for the shell, a removable perforated partition in the shell forming a coffee chamber, a nozzle mounted in the cover, and a spider attached to the cover and serving to support the vessel in the casing, one of the legs of the spider being hollow and connected to the nozzle.

9. A coffee urn comprising the combination of a casing, a partition in the casing dividing the latter into a water compartment and a coffee compartment, a vessel for ground coffee suspended in the casing above the coffee compartment and having no connection with the partition, a nozzle discharging into the vessel, a measuring device in the water compartment, a connection between the measuring device and the nozzle and a pump in said connection.

10. A coffee urn comprising the combination of a casing, a partition in the casing dividing the latter into a water compartment and a coffee compartment, this coffee compartment being open at its upper end and having a coffee outlet at its lower end, a closed vessel for ground coffee suspended above the coffee compartment, a nozzle carried by and within the vessel and a conduit extending through a wall of the vessel and having one end in communication with the nozzle and its other end connected with the outlet from the coffee compartment.

11. A coffee urn comprising the combination of a casing, a partition in the casing dividing the latter into a water compartment and a coffee compartment, this coffee compartment being open at its upper end and having a coffee outlet at its lower end, a closed vessel for ground coffee suspended above the coffee compartment, a nozzle carried by and within the vessel and a conduit extending through a wall of the vessel and having one end in communication with the nozzle and its other end connected with the outlet from the coffee compartment, this vessel being removable from the casing and the connection between the conduit and the coffee outlet being detachable.

12. A coffee urn comprising the combination of a casing, a partition in the casing dividing the latter into a water compartment and a coffee compartment, a vessel for ground coffee positioned within the casing over the coffee compartment, a nozzle carried by and within the vessel and a conduit extending through a wall thereof with one end in communication with the nozzle and its other end connected to an outlet from the coffee compartment.

13. A coffee urn comprising the combination of a casing divided into a water compartment and a coffee compartment, a removable vessel for ground coffee, a nozzle carried by and within the vessel and a conduit extending through a wall of the vessel with its inner end in communication with the nozzle and its outer end terminating outside the vessel, this outer end being adapted to be detachably connected with an outlet from the coffee compartment whereby the coffee liquid may be circulated when the vessel is in place.

14. A coffee urn comprising the combination of a casing divided into a water compartment and a coffee compartment, a removable vessel for ground coffee, a nozzle carried by and within the vessel, a conduit extending through a wall of the vessel with its inner end in communication with the nozzle and its outer end terminating outside the vessel and a measuring device within the water compartment, the outer end of the conduit adapted to be detachably connected with the measuring device whereby a measured quantity of water may be transferred from the water compartment to the coffee compartment when the vessel is in place.

15. A coffee urn comprising the combination of a casing, a partition in the casing dividing the latter into a water compartment and a coffee compartment, this coffee compartment being open at its upper end and having a coffee outlet at its lower end, a shield resting upon the upper edge of the casing, this shield being of annular form and bridging the space between the casing and the coffee compartment and out of contact with the walls of the coffee compartment, a vessel for ground coffee suspended above the coffee compartment and projecting into the compartment through the annular shield, a nozzle in the vessel and a pipe connection between the nozzle and the coffee outlet.

16. A coffee urn comprising the combination of a casing, a partition in the casing dividing the latter into a water compartment and a coffee compartment, this coffee compartment being open at its upper end and having a coffee outlet at its lower end, a shield of annular form bridging the space between the casing and the coffee compartment and projecting a slight distance into the open end of the coffee compartment and out of contact with the walls thereof, a vessel for ground coffee suspended above the coffee compartment and projecting into the compartment through the annular shield, a nozzle in the vessel and a pipe connection between the nozzle and the coffee outlet.

In testimony whereof I affix my signature.

VICTOR LAMBERT.